United States Patent
Schuette

(10) Patent No.: US 8,543,879 B2
(45) Date of Patent: Sep. 24, 2013

(54) METHOD AND APPARATUS FOR CORRECTION OF DIGITALLY TRANSMITTED INFORMATION

(75) Inventor: Steffen Schuette, Apelern (DE)

(73) Assignee: dSPACE digital signal processing and control engineering GmbH, Paderborn (DE)

( * ) Notice: Subject to any disclaimer, the term of this patent is extended or adjusted under 35 U.S.C. 154(b) by 149 days.

(21) Appl. No.: 12/941,784

(22) Filed: Nov. 8, 2010

(65) Prior Publication Data

US 2011/0060936 A1    Mar. 10, 2011

Related U.S. Application Data

(63) Continuation of application No. PCT/EP2009/002212, filed on Mar. 26, 2009.

(30) Foreign Application Priority Data

May 8, 2008 (DE) .......................... 10 2008 022 839

(51) Int. Cl.
 *G06F 11/00* (2006.01)
(52) U.S. Cl.
 USPC ............................ 714/746; 709/223; 709/246
(58) Field of Classification Search
 USPC .................. 709/223–224, 246; 714/746, 762
 See application file for complete search history.

(56) References Cited

U.S. PATENT DOCUMENTS 5,703,783 A * 12/1997 Allen et al. .................. 700/213
6,023,536 A    2/2000 Visser (Continued)

FOREIGN PATENT DOCUMENTS

CN    101176289 A    5/2008
EP    0 817 099 A2    1/1998

(Continued)

OTHER PUBLICATIONS

International Preliminary Report on Patentability for PCT/EP2009/002212.

(Continued)

*Primary Examiner* — Oanh Duong
(74) *Attorney, Agent, or Firm* — Muncy, Geissler, Olds & Lowe, PLLC

(57) ABSTRACT

A method and correct apparatus for correction of at least one digital information item which is transmitted by at least one information source to at least one information sink is provided. The information source can be connected both to an information sink and also to a correction apparatus by means of a data transmission medium. The information processed by the information source for the information sink comprises a first variable name, with the following process steps: a) provision of listed variable names in a second memory area of the correction apparatus, b) then the information source transmits an information item which contains the first variable name, c) extraction of the first variable name from the transmitted information item and saving thereof in a first memory area, d) comparison of the first variable name with a listed variable name and determination of a discrimination criterion on the basis of this comparison, e) a decision is made using the discrimination criterion as to whether the first variable name remains unchanged or is replaced by the listed variable name from method step c) or whether method steps d) and e) are to be repeated by application of an additional, listed variable name and by determining of an additional discrimination criterion.

17 Claims, 1 Drawing Sheet

(56) References Cited

U.S. PATENT DOCUMENTS

| | | | |
|---|---|---|---|
| 6,327,373 B1* | 12/2001 | Yura | 382/101 |
| 6,327,509 B1* | 12/2001 | Ashida | 700/5 |
| 6,813,323 B2 | 11/2004 | Kajita et al. | |
| RE42,509 E * | 6/2011 | Nagashima et al. | 715/234 |
| 2002/0051466 A1* | 5/2002 | Bruckman | 370/474 |
| 2002/0147724 A1* | 10/2002 | Fries et al. | 707/100 |
| 2003/0018671 A1* | 1/2003 | Bera | 708/200 |
| 2003/0138144 A1 | 7/2003 | Lynggaard | |
| 2004/0006612 A1* | 1/2004 | Jibbe et al. | 709/223 |
| 2004/0065598 A1* | 4/2004 | Ross et al. | 707/3 |
| 2006/0259159 A1 | 11/2006 | Zielinski | |
| 2007/0208824 A1* | 9/2007 | Ullman et al. | 709/217 |
| 2008/0270445 A1* | 10/2008 | Cypher et al. | 707/102 |

FOREIGN PATENT DOCUMENTS

| | | |
|---|---|---|
| JP | 6-119158 | 4/1994 |
| JP | 2002-164871 A | 6/2002 |
| WO | WO 2006/084693 A1 | 1/1998 |
| WO | WO 02/079970 A2 | 10/2002 |
| WO | WO 2006/105108 A2 | 10/2006 |
| WO | WO 2007/041114 A1 | 4/2007 |

OTHER PUBLICATIONS

Japanese Office Action for Japanese Application No. 2011-507798 dated Feb. 8, 2013 with English translation.

* cited by examiner

METHOD AND APPARATUS FOR CORRECTION OF DIGITALLY TRANSMITTED INFORMATION

This nonprovisional application is a continuation of International Application No. PCT/EP2009/002212, which was filed on Mar. 26, 2009, and which claims priority to German Patent Application No. DE 10 2008 022 839.7, which was filed in Germany on May 8, 2008, and which are both herein incorporated by reference.

BACKGROUND OF THE INVENTION

1. Field of the Invention

The invention relates to a method and an apparatus for correcting digital information transmitted by an information source to an information sink.

2. Description of the Background Art

Information sources and information sinks may be located on a single computer or on multiple networked computers or other microprocessor-controlled systems (for example, control units from the automotive industry). If the information sources and information sinks are located on a single computer system, the information source may include a first computer program or a first computer program section, and the information sink may include a second computer program or a second computer program section.

If the information source and information sink are not located on a single computer system, but rather on multiple computers or microprocessor-controlled systems, the invention presupposes that these computers or systems are networked with one another.

A networked system, for the purpose of the invention, includes at least two network components, each of which has the capability to transmit digital information and/or to receive digital information, or to be more precise, the information source should at least be able to transmit information and the information source should at least be able to receive information.

A wide variety of methods and devices for information transmission within a networked system are known from the prior art. Bus systems constitute a subset of networked systems, and these are frequently described by standards.

Examples of bus systems that are also used in the automotive industry or in industrial automation are the CAN (Controller Area Network) per ISO 11898, the LIN (Local Interconnect Network), and FlexRay. Details on these may be found in the book, "Bussysteme in der Fahrzeugtechnik" by W. Zimmermann and R. Schmidgall, 1$^{st}$ edition April 2006, Friedr. Vieweg & Sohn Verlag, GWV Fachverlage GmbH, Wiesbaden, Germany.

The components connected to the bus system are often referred to as bus users or as nodes. These bus users may be, for example, control units, on-board computers, intelligent sensors and intelligent actuators, etc. The structure, functions, and characteristics of bus topologies, bus protocols, and bus interfaces are known to the individual skilled in the art, and hence are not part of this description.

In like manner, it is known to record the information that is exchanged between the network components (in particular the bus users) in order to use the recordings for such purposes as, e.g., analysis and/or diagnostics and/or testing and/or simulation.

The information exchanged over the network often contains values for variables or for signals (variable values or signal values) that represent defined states of the components of the networked system.

Since it is not important for the description of the invention whether a variable or a signal is transmitted and since, moreover, a signal can be represented by a variable, in the following explanation the term "variable" should be understood to include both its literal meaning and also as a synonym for "signal." The same applies to the terms "variable value" and "signal value" in the text below. For correct transmission of the variable values, it is of course essential for the receiving side to be able to unambiguously identify what variable was or will be transmitted by the transmitting side. For this purpose, it is customary to assign a name to the variables. Accordingly, the information transmitted over the network contains a variable name and frequently also a variable value associated with the variable name. If only the variable name is transmitted via the network without a variable value, then depending on a predefined convention, which is to say on whether "positive" or "negative" logic is to be applied, this can mean, for example, that the variable should be interpreted by the information sink as being in the "ON" state (positive logic) or in the "OFF" state (negative logic).

Normally, the variable name that is assigned by the information source (for example, a first control unit) is known to the information sink (for example, a second control unit). For example, a variable with the name "Signal1_Out" can be transmitted from the information source to the information sink over the network. In the typical case, the information sink will temporarily store the variable "Signal1_Out" and transmit it to a software component that uses this variable.

The variable names in a networked system may be bound by naming conventions, so that, for example, a variable originating from an information source (for example, a first bus user) has a name ending with "Out," and a variable read in from the network by an information sink (for example, a second bus user) must have a name ending with "In" prior to further use. Thus, in this example the information sink would first have to rename the variable after reading it in. As long as this procedure is used by all information sinks (which is to say, for example, all bus users that read information from the bus), corresponding renaming of the variables can be implemented relatively easily by programming means.

However, programming errors, inattention in the assignment of names, or inconsistencies in the allocation of variable lists or associated alias lists can cause the variable names at the information source and information sink to differ from one another, and not in a predictable manner (for example with the identifier "Out" instead of "In") as described in the previous paragraph, but rather in an arbitrary, unpredictable manner. The incorrect characters can occur in the variable names at any point in the variable's name string, with it being possible for the affected variable name to have too many or too few characters, and possibly incorrect characters in any given case as well.

If an incorrect variable name is transmitted via bus during communication between network components, which is to say between bus users, for example, this necessarily results in a transmission error. Troubleshooting (debugging) can be very tedious and time-consuming, for example in networked systems with, e.g., several hundred or more variables.

An equally serious problem will generally arise if variable values are exchanged between an information source and an information sink on a single computer or on a single microprocessor-controlled device and the corresponding variable names do not match. This could be the case, for example, if the information source is comprised primarily of a first computer program or a first computer program section and the information sink is comprised primarily of a second computer program or a second computer program section, and the first variable provided by the information source does not have a name that is "expected" by the information sink.

SUMMARY OF THE INVENTION

It is therefore an object of the present invention to provide a method and an apparatus that enable the aforesaid information sources and information sinks to carry out proper communication even in the presence of variable names containing errors.

Not only can the solution be used when the information sources and information sinks are network components, such as bus users for example, but also when the information source and the information sink are located on the same computer or a comparable device, for example a control unit from the automotive industry.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
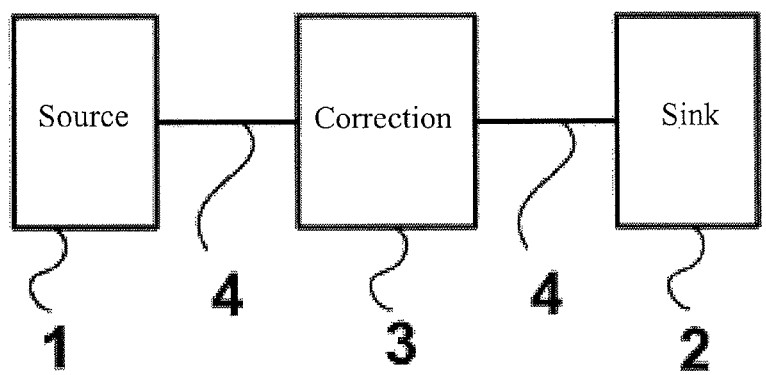
FIG. 1 schematically shows the connection between an information source, a correction apparatus, and an information sink according to an embodiment of the present invention.
Figure 2:
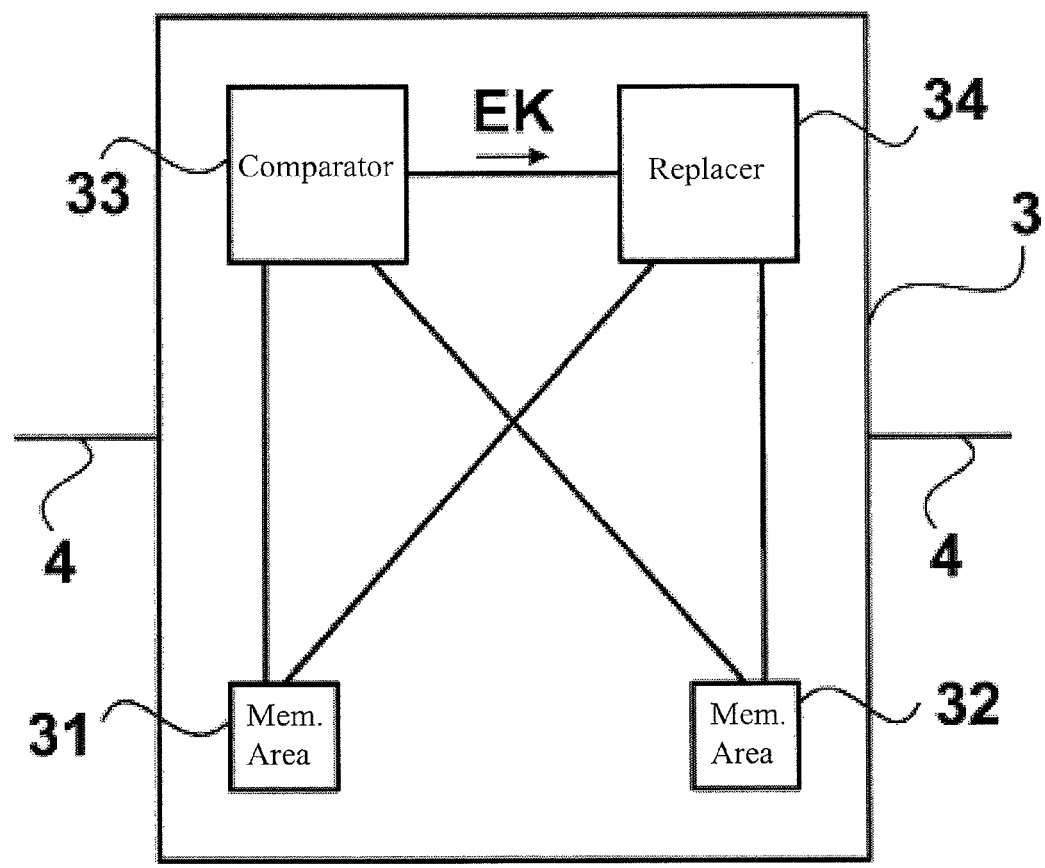
FIG. 2 schematically shows details of the correction apparatus according to an embodiment the invention.

The solution for the problem on which the invention is based resides in providing a method for correcting at least one item of digital information that is transmitted from at least one information source (1) to at least one information sink (2), wherein the information source is connected by means of a data transmission medium (4) to both the information sink and to a correction apparatus (3), wherein the information provided for the information sink by the information source includes a first variable name, having the following method steps: a) provision of listed variable names in a second memory area (32) of the correction apparatus (3), b) transmission of an item of information containing the first variable name by the information source, c) extraction of the first variable name from the transmitted information and storage in a first memory area (31), d) comparison of the first variable name with a listed variable name and ascertainment of a decision criterion (EK) on the basis of this comparison, and d) deciding, using the decision criterion (EK), whether the first variable name remains unchanged or is replaced by the listed variable name from method step d), or whether method steps d) and e) are repeated using another listed variable name and by means of ascertainment of another decision criterion.

"Listed" variable names can be understood as those variable names that are permissible for the information sink, or in other words are "expected" by the information sink. Contrasting therewith are "unlisted" variable names, in other words those variable names that are "unknown" to the information sink and, as a result, generally cannot be processed further by the information sink without the inventive method. An exception to this rule could only occur when all unlisted variable names differ from the listed variable names in a predictable manner. For this special case, a simpler method would be possible that renames all variable names in the same way. In contrast, the inventive method does not require predictable variation in the variable names, but instead is able to make a correction even in the case of unpredictable deviation.

In an embodiment of the inventive method, provision can be made that the aforementioned method steps d) and e) are repeated using another listed variable name each time until the comparison of the first variable name and the additional listed variable name produces a match, or all listed variable names have been compared to the first variable name, wherein for each of these comparisons an associated decision criterion is ascertained that represents a measure for the degree of agreement between the first variable name and the respective associated additional listed variable name.

In another embodiment, the inventive method can provide that the decision criterion is a function of the total of the matching characters of the first variable name and the listed variable name.

Another embodiment of the method can provide that, as one of the steps in ascertaining the decision criterion, a decomposition of the first variable name and of the listed variable name into fragments takes place, and subsequently a comparison of the fragments of these two variable names takes place.

In this design, it is possible in particular to provide that the length of the fragments is iteratively reduced down to a minimum fragment length until one or more matches is or are determined in the comparison of the fragments of the first variable name and the fragments of the listed variable name.

Moreover, in this embodiment the minimum fragment length can be designed to be settable by the user of this method.

Insofar as the method provides that, as one of the steps in ascertaining the decision criterion, a decomposition of the first variable name and of the listed variable name into fragments takes place, and subsequently a comparison of the fragments of these two variable names takes place, the method can be refined in such a manner that, in the comparison of the fragments of the first variable name and of the listed variable name, a different weighting can be assigned by the user of the method to a match of the variable fragments of the two variable names as a function of the position of the fragments within the variable name.

In the event that it proves impossible to replace an "incorrect" first variable name with a listed variable name within the inventive method or one of the additional embodiments, for example in the case that none of the characters of the first variable name matches a character of a listed variable name, then provision can be made for the lack of replaceability to be reported to the user of the method and the user to be offered the option of manual replacement.

The problem on which the invention is based is likewise solved by the provision of a correction apparatus (3) for eliminating character errors in variable names, wherein the variable names can be transmitted from an information source (1) to an information sink (2), and wherein the correction apparatus has the following features:

The correction apparatus can be connectable via a data transmission medium (4) to the information source (1) and to the information sink (2), and has a first memory area (31) for temporary storage of the variable name transmitted by the information source, and has a second memory area (32) for storage of listed variable names, and includes a comparator for comparison (33) that is provided and configured to compare the variable name from the first memory area (31) with listed variable names from the second memory area (32), to derive a decision criterion (EK) from the comparison, and to provide the decision criterion (EK) for a replacement component (34), and also includes a replacement component (34) that is provided and configured to leave the variable name from the first memory area (31) unchanged or to replace it with a listed variable name from the second memory area (32) as a function of the decision criterion (EK).

A variety of alternatives may be used as the data transmission medium, such as data cables, radio links, fiber optic cables, a memory that is jointly used by the data source and the data sink (shared memory), a hard disk memory, or the like. Persons skilled in the art are aware of how these various data transmission media can be implemented in devices. Consequently, this will not be described in the present patent application.

As desired, replacement of the first variable name by a listed variable name can take place either through an actual exchange, or through marking of the first variable name in such a manner that the marking points to a listed variable name, wherein the information sink can evaluate this pointer.

An embodiment of the inventive correction apparatus can provide for the information source, information sink, and correction apparatus to be located on a single computer.

In this arrangement, provision can be made for the information source to be composed essentially of a first computer program or a first computer program section, and the information sink to be composed essentially of a second computer program or a second computer program section. Alternatively, the information source connected to the correction apparatus can be located on a first computer and/or other microprocessor-controlled device (for example, control units from the automotive industry), and the information sink connected to the correction apparatus can be located on another computer and/or other microprocessor-controlled device, wherein these computers and/or microprocessor-controlled devices are networked with one another.

Moreover, provision can be made in this arrangement for the networking to be implemented through a bus system.

A particular advantage of the method according to the invention and the correction apparatus according to the invention is that any errors or unpredictable deviations in the variable names that may occur can be corrected automatically therewith, and consequently troubleshooting—which frequently is resource-intensive—can be avoided.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A method for correcting at least one item of digital information that is transmitted by at least one information source to at least one information sink, the information source being connectable via a data transmission medium to both the information sink and to a correction apparatus, the information provided for the information sink by the information source includes a first variable name, the method comprising:
   a) providing listed variable names in a second memory area of the correction apparatus;
   b) transmitting an item of information containing the first variable name by the information source;
   c) extracting the first variable name from the transmitted information and storage in a first memory area;
   d) comparing the first variable name with a listed variable name and ascertainment of a decision criterion based on the comparison; and
   e) deciding, using the decision criterion, whether the first variable name remains unchanged or is replaced by the listed variable name from step d), or whether steps d) and e) are repeated using another listed variable name and via ascertainment of another decision criterion,
   wherein each of the first variable name and the listed variable names corresponds to a stored value that represents a defined state of a system component.

2. The method according to claim 1, wherein the steps d) and e) are repeated using another listed variable name each time until the comparison of the first variable name and the listed variable name produces a match or all listed variable names have been compared to the first variable name, and wherein for each of these comparisons an associated decision criterion is ascertained that represents a measure for the degree of agreement between the first variable name and the respective associated additional listed variable name.

3. The method according to claim 1, wherein the decision criterion is a function of a total of the matching characters of the first variable name and the listed variable name.

4. The method according to claim 1, wherein, as one of the steps in ascertaining the decision criterion, a decomposition of the first variable name and of the listed variable name into fragments takes place, and subsequently a comparison of the fragments of these two variable names takes place.

5. The method according to claim 4, wherein the length of the fragments is iteratively reduced down to a minimum fragment length until one or more matches is or are determined in the comparison of the fragments of the first variable name and the fragments of the listed variable name.

6. The method according to claim 5, wherein the minimum fragment length is set by a user.

7. The method according to claim 1, further comprising replacing the first variable name with the listed variable name when the decision criterion indicates a degree of agreement between the first variable name and the listed variable name above a given threshold.

8. A method for correcting at least one item of digital information that is transmitted by at least one information source to at least one information sink, the information source being connectable via a data transmission medium to both the information sink and to a correction apparatus, the information provided for the information sink by the information source includes a first variable name, the method comprising:
   a) providing listed variable names in a second memory area of the correction apparatus;
   b) transmitting an item of information containing the first variable name by the information source;
   c) extracting the first variable name from the transmitted information and storage in a first memory area;
   d) comparing the first variable name with a listed variable name and ascertainment of a decision criterion based on the comparison; and
   e) deciding, using the decision criterion, whether the first variable name remains unchanged or is replaced by the listed variable name from step d), or whether steps d) and e) are repeated using another listed variable name and via ascertainment of another decision criterion,
   wherein, as one of the steps in ascertaining the decision criterion, a decomposition of the first variable name and of the listed variable name into fragments takes place, and subsequently a comparison of the fragments of these two variable names takes place, and wherein, in the comparison of the fragments of the first variable name and listed variable name, a different weighting is assigned by a user to a match of variable fragments of the two variable names as a function of position of the variable fragments within the two variable names.

9. A correction apparatus for eliminating character errors in variable names, wherein the variable names are transmittable from an information source to an information sink, the correction apparatus being connectable via a data transmission medium to the information source and to the information sink, the apparatus comprising:

a first memory area configured to temporarily store one of the variable names transmitted by the information source; and a second memory area configured to store listed variable names, a replacement component; and a comparator configured to compare the variable name from the first memory area with the listed variable names from the second memory area, configured to derive a decision criterion from the comparison, and configured to provide the decision criterion for the replacement component, wherein the replacement component is configured to leave the variable name from the first memory area unchanged or to replace it with a listed variable name from the second memory area as a function of the decision criterion, and wherein each of the variable name from the first memory, area and the listed variable names from the second memory area corresponds to a stored value that represents a defined state of a system component.

10. The correction apparatus according to claim 9, wherein the information source, the information sink, and the correction apparatus are located on a single computer.

11. The correction apparatus according to claim 10, wherein the information source includes a first computer program or a first computer program section, and the information sink includes a second computer program or a second computer program section.

12. The correction apparatus according to claim 9, wherein the information source is located on a first computer and/or other microprocessor-controlled device, and wherein the information sink is located on another computer and/or other microprocessor-controlled device, wherein the computers and/or microprocessor-controlled devices are networked with one another.

13. The correction apparatus according to claim 12, wherein the networking is implemented through a bus system.

14. The correction apparatus according to claim 12, wherein the microprocessor-controlled device is a control unit for a vehicle.

15. A method for correcting at least one item of digital information exchanged between at least one information source and at least one information sink, the method comprising:

receiving an item of information containing a first variable name from the information source, wherein the first variable name corresponds to a stored value that represents a defined state of a system component;

storing the first variable name in a first memory area;

comparing the first variable name to one or more listed variable names in a variable name list stored in a second memory area;

ascertaining, based on the comparison, a decision criterion relating to a degree of agreement between the first variable name and the one or more listed variable names; and replacing, based on the decision criterion, the first variable name with the replacement name from among the one or more listed variable names.

16. The method according to claim 15, further comprising selecting the replacement name as the listed variable name having the highest degree of agreement with the first variable name.

17. The method according to claim 15, wherein the ascertaining comprises:

decomposing the first variable name into at least two fragments that each comprise two or more characters;

comparing the fragments to corresponding fragments of the one or more listed variable names; and generating the decision criterion as a function of the degree of agreement between the compared fragments.

* * * * *